(12) United States Patent
Ballentine et al.

(10) Patent No.: US 10,204,177 B2
(45) Date of Patent: Feb. 12, 2019

(54) MATCHING AN ORDERED SET OF STRINGS CONTAINING WILD CARDS

(71) Applicant: International Business Machines Corporation, Armonk, NY (US)

(72) Inventors: Scott Ballentine, Poughkeepsie, NY (US); Steven B. Jones, Poughkeepsie, NY (US); Bonnie M. Ordonez, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 489 days.

(21) Appl. No.: 14/953,796

(22) Filed: Nov. 30, 2015

(65) Prior Publication Data

US 2017/0154126 A1    Jun. 1, 2017

(51) Int. Cl.
*G06F 17/30* (2006.01)

(52) U.S. Cl.
CPC .............................. *G06F 17/30985* (2013.01)

(58) Field of Classification Search
CPC combination set(s) only.
See application file for complete search history.

(56) References Cited

U.S. PATENT DOCUMENTS

| 7,257,576 | B2 * | 8/2007 | Eminovici | ........ | G06F 17/30985 |
| 7,996,427 | B1 * | 8/2011 | Flick | ................. | G06F 17/30997 |
| | | | | | 707/792 |
| 8,407,245 | B2 | 3/2013 | Ryan et al. | | |
| 8,538,946 | B1 * | 9/2013 | Thakur | ............. | G06F 17/30654 |
| | | | | | 707/706 |
| 8,626,696 | B2 | 1/2014 | Lambov | | |
| 2007/0130140 | A1 | 6/2007 | Cytron et al. | | |
| 2011/0185294 | A1 * | 7/2011 | Binder | ...................... | G06F 8/36 |
| | | | | | 715/762 |
| 2012/0130983 | A1 | 5/2012 | Ryan et al. | | |
| 2016/0110332 | A1 * | 4/2016 | Yu | ......................... | G06F 17/273 |
| | | | | | 715/271 |

OTHER PUBLICATIONS

Dayarathne et al., "Accelerating Rabin Karp on a Graphics Processing Unit (GPU) using Compute Unified Device Architecture (CUDA)," 2014 7th International Conference on Information and Automation for Sustainability (ICIAfS), 2014, pp. 1-6, Copyright © 2014, IEEE, DOI: 10.1109/ICIAFS.2014.7069589.

(Continued)

*Primary Examiner* — Etienne P Leroux
(74) *Attorney, Agent, or Firm* — Peter J. Edwards

(57) ABSTRACT

A method for matching a first list of pattern strings to a second list of data strings, the first list including zero or more wildcards, may include identifying, for each pattern string in the first list, a data string in the second list corresponding with a respective one of the pattern strings. The method may further include determining whether the first list matches the second list by determining, for each pattern string in the first list, whether a respective one of the strings includes a wildcard for matching zero or more characters of a data string corresponding with the pattern string, and further performing a wildcard string comparison between the pattern string and the data string corresponding with the pattern string. The method may additionally include providing a data value indicating whether the first list matches the second list.

20 Claims, 6 Drawing Sheets

(56) References Cited

OTHER PUBLICATIONS

Grobauer et al., "Partial Evaluation of Pattern Matching in Strings, revisited," BRICS Report Series RS-00-31, Nov. 2000, 51 pages, ISSN 0909-0878, Copyright 2000, Denmark.

IBM et al., "Method of Avoiding Multiple Hits in Pattern Matching Search," An IP.com Prior Art Database Technical Disclosure, ip.com, Original Publication Date: Jul. 1, 1991, IP.com Electronic Publication: Apr. 3, 2005, 4 pages, IP.com No. 000121135.

IBM, "Method and Apparatus for String Mapping to a Large List in a String Match System," An IP.com Prior Art Database Technical Disclosure, ip.com, Original Publication Date: Mar. 20, 2009, IP.com Electronic Publication: Mar. 20, 2009, 7 pages, IP.com No. 000180894.

Software Patent Institute et al., "Hashing the Key to Rapid Pattern Matching," An IP.com Prior Art Database Technical Disclosure, ip.com, Original Publication Date: Dec. 30, 1899, IP.com Electronic Publication: Apr. 24, 2007, 16 pages, Database entry Copyright (c) Software Patent Institute, IP.com No. 000152067.

\* cited by examiner

US 10,204,177 B2

MATCHING AN ORDERED SET OF STRINGS CONTAINING WILD CARDS

BACKGROUND

The present disclosure relates to computer software, and more specifically, to an architecture for matching a list of pattern strings against a list of data strings in a computing system.

Computers provide various commands or operations for searching and comparing data in various formats. These commands or operations may be in used computing operations such as searching a large database for a target record containing a source string, scanning a target list of processes to identify and track the execution of a source process of interest, or searching a worksheet to identify certain table data.

SUMMARY

According to embodiments of the present disclosure, method for matching a first list of pattern strings to a second list of data strings, the first and second lists stored in respective first and second data structures in memory, the first list including zero or more wildcards, may include identifying, for each pattern string in the first list, a data string in the second list corresponding with a respective one of the pattern strings. The method may further include determining whether the first list matches the second list by determining, for each pattern string in the first list, whether a respective one of the pattern strings includes a wildcard for matching zero or more characters of a data string corresponding with the pattern string, and further performing, in response to determining that the pattern string includes a wildcard, a wildcard string comparison between the pattern string and the data string corresponding with the pattern string. The method may additionally include providing, in memory, a data value indicating whether the first list matches the second list.

Other embodiments are directed towards systems and computer program products for method for matching a first list of pattern strings to a second list of data strings.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
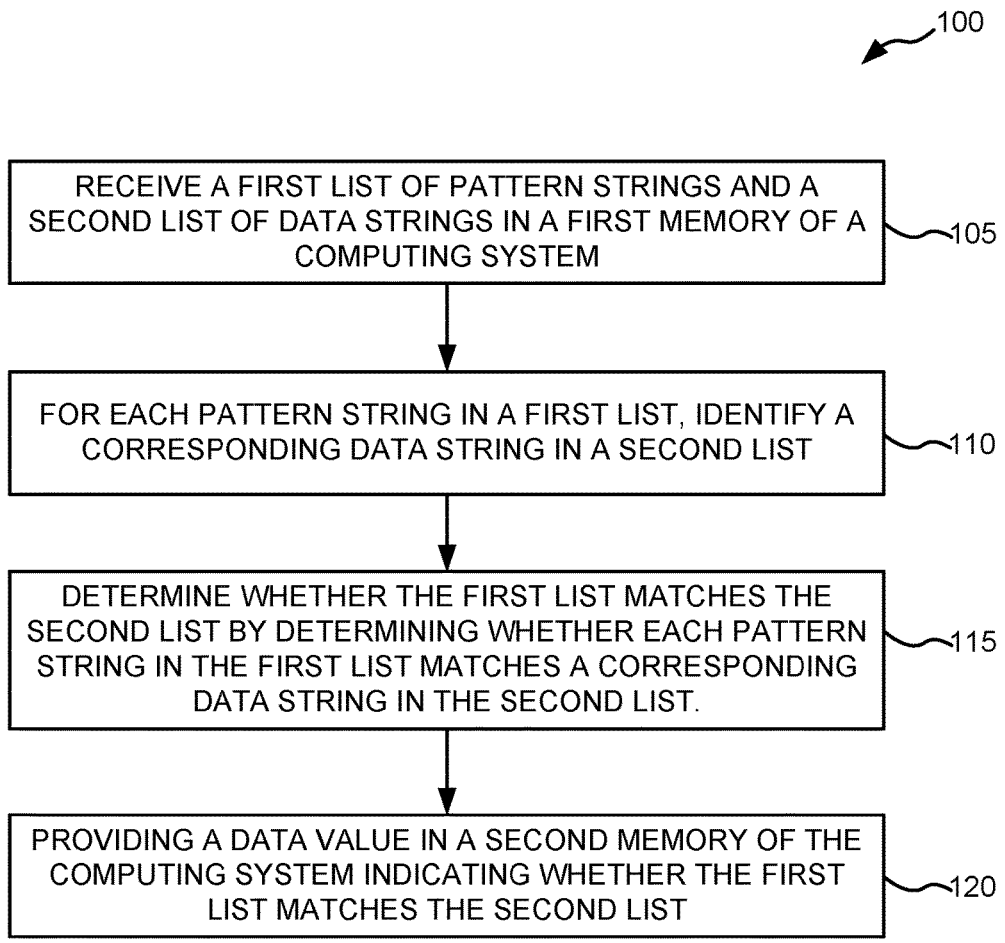
FIG. 1 depicts a flowchart of computer implemented operations for matching a list of pattern strings against a list of data strings, according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computer software, more particular aspects relate to an architecture for matching a list of pattern strings against a list of data strings in a computing system. While the present disclosure is not necessarily limited to such applications, various aspects of the disclosure may be appreciated through a discussion of various examples using this context.

Embodiments of this disclosure are based on the recognition that computing systems may improve the flexibility and efficiency of string matching algorithms by incorporating the use of wildcard characters in pattern strings. The wildcard characters may enable a set of defined or reserved characters (or symbols) in a pattern string to match one or more disparate characters in a data string. Examples of string matching algorithms that incorporate the use of wildcards include those techniques that support file "globbing" and regular expressions. These techniques may work well when matching a single source pattern string (or field) against a set of target data strings. When the source strings represent a list of individual pattern strings, additional considerations may be incorporated into the matching algorithms to realize commensurate improvements in flexibility and efficiency. One such consideration may include the form of a data structure for flexibly representing and/or storing the list of pattern strings, including, for example, wildcard characters. A second consideration may include steps or operations for matching individual pattern strings against individual data strings with consideration to wildcard usage.

Embodiments of the present disclosure concern an architecture (e.g., systems, methods, and computer program products) for matching a list of pattern strings against a list of data strings, with consideration to wildcard usage in the pattern strings. Each pattern string may be matched against a corresponding data string, where the corresponding data string occupies a same position in the list of data strings as the pattern string occupies in the list of pattern strings. The architecture further includes a data structure for specifying wildcards used in matching individual pattern strings against individual data strings, as well as operations for applying the wildcards during the string matching.

As used herein, a string may be a collection of symbols, where a symbol represents, for example, characters in an alphabet. A list of strings may include one or more strings with the span (e.g., a length) of each string delimited by fields defined according to a data structure. The span of a string, for example, may be determined by a data value (e.g., a length) indicating the number of symbols included in the string.

Figure 6:
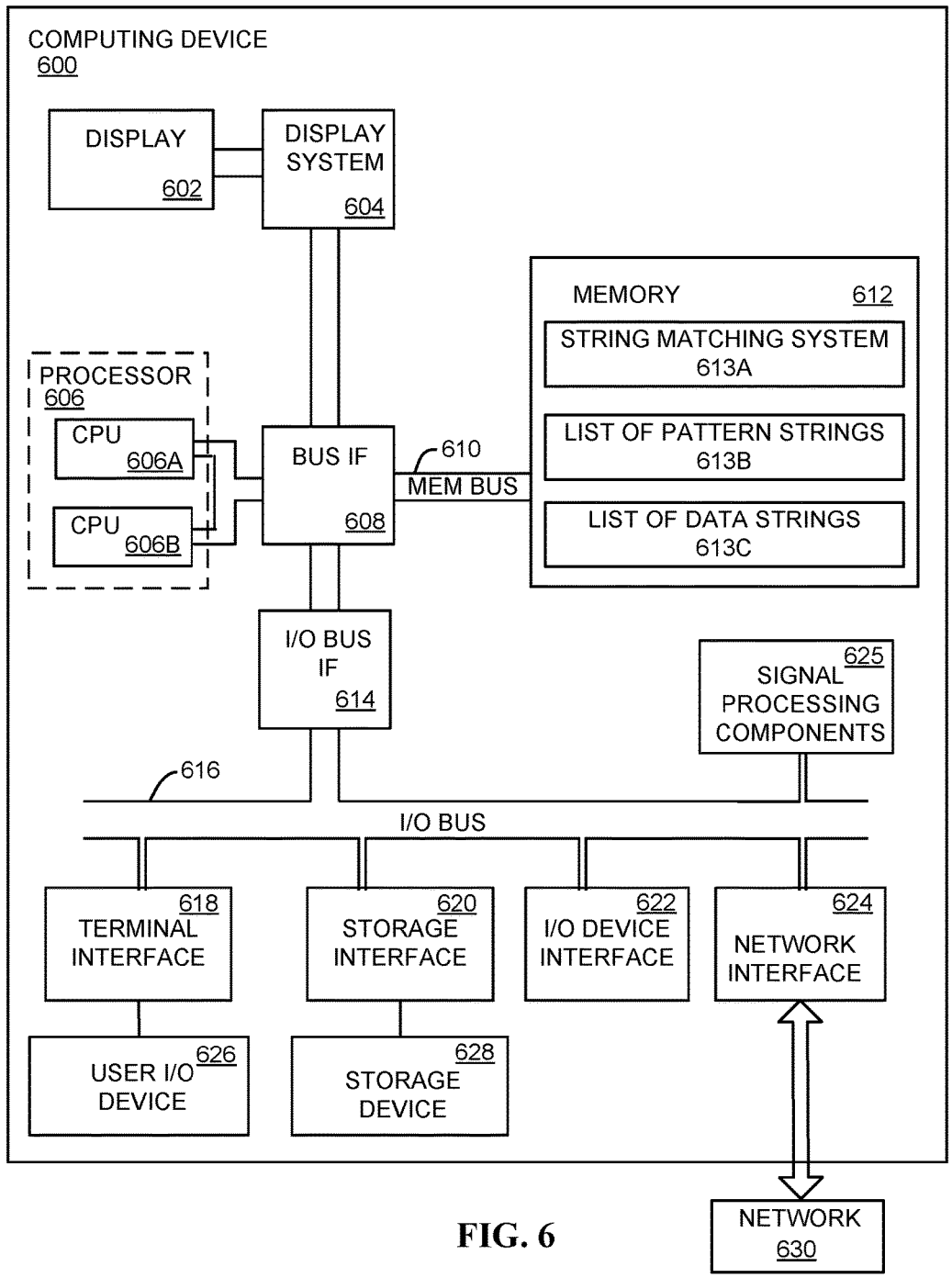
FIG. 6 depicts a block diagram of a computing device for implementing a system for matching a list of pattern strings against a list data strings, according to various embodiments.

Referring now to the figures, FIG. 1 depicts a flowchart 100 of computer implemented operations for matching a list of pattern strings against a list of data strings, according to various embodiments. Each string in the list of pattern strings may represent a particular piece of data. The particular piece of data may be related to the position of the pattern string in the list of pattern strings (e.g., the type data may be specific to the string's position in the list). An example list of pattern strings may include a first string, in a first position, representing an employee serial number and a second string, in a second position, representing the employee's office number. The list of pattern strings may be stored in a data structure comprising a repeated list of metadata-string pairs. The metadata-string pairs may include a metadata portion and one or more string portions, as described herein. The operations depicted in the flowchart 100 may be executed by hardware and/or software components of a computing system or computing device such as the computing device 600 (FIG. 6). The hardware and/or software components may collectively form a string matching system. For example, a string matching system may include a software application having computer readable code implementing the operations of flowchart 100 and executing on a processor 606 of the computing system 600 (FIG. 6).

The string matching system may begin the operations of flowchart 100 by executing operation 105. Executing operation 105 may include receiving a list of pattern strings (e.g., a first list) and a list of data strings (e.g., a second list) in a memory of a computing system. In some embodiments, the list of strings may be received from a graphical user interface (GUI), read from a storage device, and/or stored in a memory of a computing system accessible to the string matching system.

In some embodiments, a list of data strings may be logically defined within a larger collection of data strings. For example, given a collection (or file) of strings, a list of data strings may be logically defined as a consecutive set of a strings within the collection. A first list of data strings, for example, may include the first set of five strings in the collection, while a second list of data strings may include the next set of five strings following the first set in the collection. As used herein, a list of data strings may refer to any of the lists of data strings that may be derived from a collection of data strings.

The string matching system may continue the operations of flowchart 100 by executing operation 110. Executing operations 110 may include identifying, for each pattern string in the list of pattern string, a corresponding data string in the list of data strings. A data string (e.g., a first data string) in a list of data strings may correspond to a pattern string (e.g., a first pattern string) in a list of pattern strings when the data string and the pattern string each occupy a same position in their respective lists. For example, a list of pattern strings may include five pattern strings, with each pattern string occupying one of five positions or fields in the list of data strings. Likewise, a list of data strings may include five data strings, with each data string occupying one of five positions or fields in the list of data strings. A data string occupying position one (e.g., the first position) in the list of data strings may correspond to a pattern string occupying position one in the list of pattern string. In some embodiments, the string matching system may identify a data string corresponding to a pattern string by, for example, using a counter or indexing construct to traverse and select strings from both the list of pattern strings and the list of data strings.

The string matching system may further continue the operations of flowchart 100 by executing operation 115. Executing operation 115 may include determining whether the list of pattern strings matches the list of data strings. A list of pattern strings may match a list of data strings when each pattern string in the list of pattern strings matches a corresponding data string in the list of data strings.

Determining whether each pattern string matches a corresponding data string may include comparing the number of pattern strings in the list of pattern strings against the number of data strings in the list of data strings. In some embodiments, the string matching system may determine that the list of pattern strings and the list of data strings do not match when the number of data strings is less than the number of pattern strings. In certain embodiments, the string matching system may determine that the list of pattern strings and the list of data strings do not match when the number of data strings is greater than the number of pattern strings and the list of pattern strings does not include a wildcard for matching all remaining strings in the list of data strings.

Determining whether each pattern string matches a corresponding data string may further include comparing each pattern string against a corresponding data string. In some embodiments, matching a pattern string to a corresponding data string may include matching a metadata-string pair corresponding with the pattern string to the data string. The metadata-string pair may be data structures having a metadata portion and a pattern string portion. The metadata portion of a metadata-string pair may include information indicating the size of the pattern string, and information representing whether wildcards are included in the pattern string. Examples of wildcards that may be included in a pattern string include wildcards for matching exactly one character (or symbol), wildcards for matching zero or more characters, and wildcards for matching all remaining strings in a list of data strings. The pattern string portion of the metadata-string pair may include a wildcard character when a field of the metadata portion indicates that the pattern string includes a wildcard.

In some embodiments, the string matching system may perform an exact (or direct) string compare between the pattern string portion of the metadata-string pair and a corresponding data string when a metadata portion indicates that the pattern string does not include a wildcard. An exact string comparison may include comparing the length of the pattern string against the length of the corresponding data string. A direct string comparison may further include comparing characters of the pattern string against corresponding characters of the data string (e.g., comparing each character of the pattern string against a corresponding character of the data string). In some embodiments, the string matching system may determine that a pattern string matches a data string when the size of both strings are equal and corresponding characters match.

In certain embodiments, the string matching system may perform a wildcard string comparison (e.g., a wildcard match) between the pattern string portion of the metadata-string pair and a corresponding data string when the metadata portion indicates that the pattern string includes a wildcard. A wildcard comparison may include comparing, for example, a wild card expansion of a pattern string against a corresponding data string. The string matching system may indicate that a pattern string having a wildcard matches a corresponding data string when a wildcard expansion of the pattern string matches the corresponding data string. Examples of a wild card match are included in the discussion of FIGS. 4A and 4B.

The string matching system may execute operation 120 by providing the results of the determination of whether the received list of pattern strings matches a list of data strings to a computing system (or an application of a computing system). In some embodiments, the string matching system may provide the results as a data value stored in a memory of a computing system.

While an example embodiment of the operations of flowchart 100 is described herein, other variants of the flowchart 100 are contemplated. In some variants one or more operations of the flowchart 100 may be executed in a different order than indicated in FIG. 1. In other embodiments, additional operations may be added to further the execution of the operations of flowchart 100.

Figure 2:
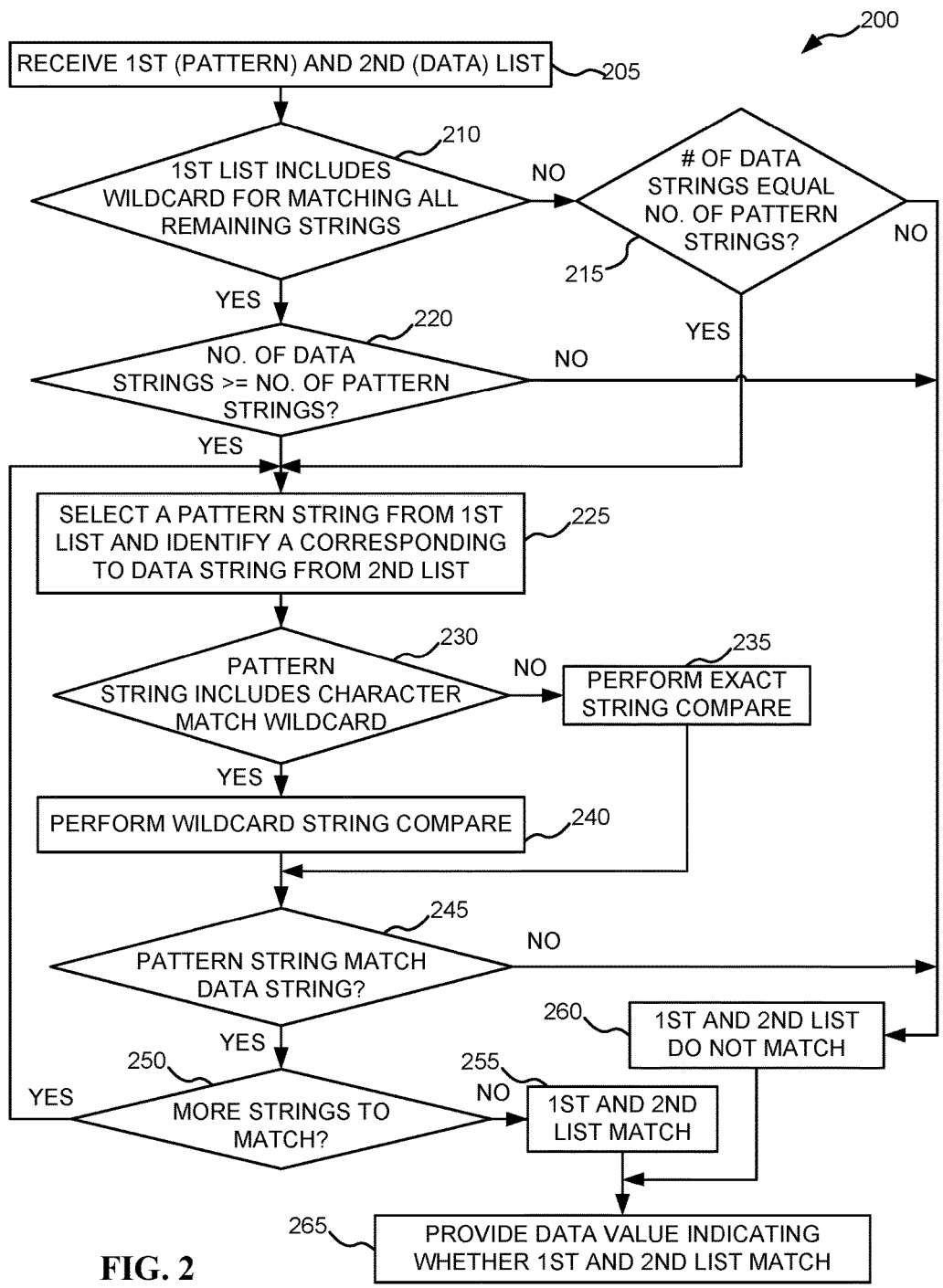
FIG. 2 depicts a flowchart of an example embodiment of computer implemented operations for matching a list of pattern strings against a list of data strings, according to various embodiments.

FIG. 2 depicts a flowchart 200 of an example set of a computer implemented operations for matching a list of pattern strings (e.g., a first list) against a list of data strings (e.g., a second list), according to various embodiments. The operations depicted in the flowchart 200 may be executed by hardware and/or software components of a computing system. The hardware and/or software components collectively form a string matching system. For example, a string matching system may include a software application having computer readable code implementing the operations of flowchart 200 and executing on a processor 606 of the computing system 600 (FIG. 6).

As shown in operation 205, the string matching system may receive a list of pattern strings and a list of data strings from, for example, a GUI, a storage device, or other digital communications channels (e.g., a data communication network or inter-process communication). The string matching system may store the received lists in, or access the received lists from, a memory of a computing system, as described herein.

As shown in operation 210, the string matching system may determine whether the list of pattern strings includes a wildcard for matching all remaining strings in the list of data strings. In some embodiments, a wild card for matching all remaining strings in list of data strings may include a percentage symbol (e.g., "%"). Additionally, the wildcard may be included in the last metadata-string pair in the list of pattern strings. In some embodiments, the string matching system may determine that the list of pattern strings includes a wildcard for matching all remaining strings of a list of data strings by, for example, accessing the memory of the computer system having the list of pattern strings data structure to determine whether the metadata included in the last metadata string pair includes a flag indicating the presence of the wildcard.

When the number of data strings in the list of data strings exceeds the number of pattern strings in the list of pattern strings, the wildcard for matching all remaining strings may be interpreted as a match for all data strings having a position in the list of data strings that exceeds the position of the last pattern string in the list of pattern strings. For example, a list of seven data strings may match a list of five pattern strings when the first four data strings match the first four pattern strings, and when the fifth pattern string includes a wildcard for matching all remaining data strings in the list of data strings.

When the list of pattern strings includes a wildcard for matching all remaining data strings, the string matching system may determine whether the number of data strings in the list of data strings is greater than or equal to the number of pattern strings in the list of pattern strings, as shown in operation 220. The string matching system may determine the number of pattern strings by reading a field of the metadata associated with the list of pattern strings data structure. The string matching system may additionally determine the number of pattern strings in the list of pattern strings by counting the number of metadata-strings pairs in the list of pattern strings' data structure. The string matching system may proceed to operation 260 when the number of data strings is less than the number of pattern strings, while the string matching system may continue to operation 225 when the number of data strings is greater than or equal to the number of pattern strings.

As shown in operation 215, when the list of pattern strings does not include a wildcard for matching all remaining data strings, the string matching system may determine whether the number of data strings in the list of data strings is equal to the number of pattern strings in the list of pattern strings. The string matching system may continue to operation 225 when the number of data strings is equal to the number of pattern strings, while the string matching system may proceed to operation 260 when the number of data strings does not equal the number of pattern strings.

As shown in operation 225, the string matching system may select a pattern string from the list of pattern strings and identify a data string corresponding to the selected pattern string. In some embodiments, the string matching system may select the pattern string based on a sequence determined by the metadata associated with the list of pattern strings data structure. For example, the metadata may include data indicating a length and a position of each pattern string in the list of pattern strings. Once a position of the first pattern string is identified from the metadata and matched by the string matching system, a second pattern string may be selected for matching (e.g., the position of the second string in the list may be determined) by adding an offset to the position of the first string in the list of pattern strings data structure. The offset may include the length of the first string. In this way, strings may be selected according to the sequence in which they appear in the list of pattern strings. In certain embodiments, strings may be selected according to other sequences (e.g., according to fields or string positions that are most likely to pertain to unique pattern strings or data).

As shown in operation 230, the string matching system may determine whether the selected pattern string includes a character matching wildcard. In some embodiments, a character matching wildcard may match exactly one character (e.g., a wildcard having a question symbol, '?'). In certain embodiments, a character matching wildcard may match zero or more characters (e.g., a wildcard having an asterisk symbol, "*"). In some embodiments, the string matching system may determine that the pattern string includes a character matching wildcard by, for example, accessing the memory of the computer system having the list of pattern strings to determine whether the metadata included in the metadata string pair associated with the pattern string includes a flag indicating the presence of a character matching wildcard.

The string matching system may perform an exact string compare when the selected pattern string does not include a character matching wildcard, as shown in operation 235. In some embodiments, when the string portion of a metadata-string pair includes multiple strings and the metadata portion indicates that wildcard characters are not present, the string matching system may compare multiple strings in one operation, increasing the efficiency of string comparison by eliminating the overhead of stepping through and comparing each individual string. The string matching may combine two adjacent strings in the pattern list (e.g., two strings that do not include wildcards) and compare the combined string to corresponding strings (e.g., strings corresponding with each of the combined strings) in a list of data strings. The string matching system may determine the span of the strings to match using a data value (e.g., an offset value) stored in the metadata portion to indicate the length of all strings associated with the metadata (as described in the discussion 325B of FIG. 3). In certain embodiments, the string matching system may perform a wildcard string compare when the selected pattern string includes a character matching wildcard, as shown in operation 240.

As shown in operation 245, the string matching system may determine, based on the result of operations 240 and/or 235, whether the selected pattern string matches a corresponding data string. The string matching system may continue to operation 250 when a selected pattern string matches a corresponding data string, while the string matching system may proceed to operation 260 when a selected pattern string does not match a corresponding data string.

As shown in operation 250, the string matching system may determine whether there are additional pattern and data strings to match (e.g., determine whether all pattern strings in the list of pattern strings have already been matched against corresponding data strings). The string matching system may return to operation 225 when there are additional strings to match, while the string matching system may continue to operation 255 when there are no additional pattern and data strings to match.

The string matching system may determine that the list of pattern strings matches the list of data strings at operation 255. Alternatively, the string matching system may determine that the list of pattern strings does not match the list of data strings at operation 260. The string matching system may then continue to operation 265 and provide an indication of the match in a memory of a computing system.

Figure 3:
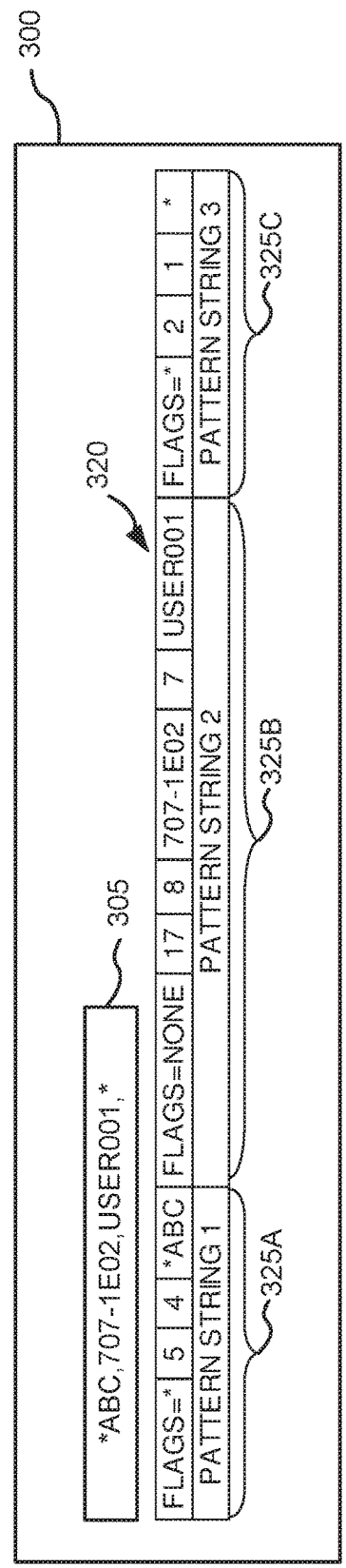
FIG. 3 depicts a diagram of an example data structure for storing a list of patterns having zero or more wildcards, according to various embodiments.

FIG. 3 depicts a diagram of an example 300 of a data structure for storing a list of pattern strings having zero or more wildcards, according to various embodiments. The example 300 includes a sparse list of pattern strings (e.g., a list of data strings without associated metadata) 305, and a data structure 320 for storing the list of data strings. The sparse list of pattern strings includes four pattern strings, while the data structure 320 includes three corresponding metadata-strings pairs 325A, 325B and 325C.

Each metadata-string pair in the data structure 320 may include a set of metadata fields (e.g., the metadata portion) and a set of pattern string fields (e.g., the pattern string portion). For example, the metadata-string pair for the first pattern string 325A (e.g., the pattern string "*ABC") includes three metadata fields (e.g., fields having the data "FLAGS=*", "5", and "4") along with a single pattern string field (e.g., "*ABC"). A first metadata field (e.g., a flags field) may include a set of bits or flags that indicate whether the pattern strings include wildcards. In some embodiments, the metadata may include additional flags to indicate specific placement of wildcards in the pattern strings. For example, additional flags may be used to indicate that multiple wildcard characters are present, or that only one wildcard character in the last position of the string is present. These additional flags can be used by the string pattern matching system to perform optimized string matching operations in place of more general, un-optimized string comparison operations. In certain embodiments, the additional flags may be in the first field metadata field, or a different metadata field.

A second metadata field (e.g., an offset field) may indicate an offset in, for example, a number of data units (e.g., bytes or works), to the next metadata-string pair in the list of pattern strings data structure 320. In some embodiments, the offset may be measured from the next data unit following the position of the offset field in the data structure 320. The metadata-string pair 325A, for example, includes an offset field having a value of 5, which indicates that a counter used to index the data structure 320 may be offset by 5 data units to index to the location of the next metadata-string pair 325B.

A third metadata field (e.g., a length field) may indicate a length, in a given data unit, of the pattern string. The metadata-string pair 325A for example includes a 4 in the length field, indicating that the pattern string "*ABC" is 4 data units long.

In some embodiments, the metadata-string pair may include fields for storing more than one pattern string. For example, the second and third pattern strings (e.g., the pattern strings "707-1E02" and "USER001") are represented in a single metadata-string pair 325B. The metadata-string pair having multiple pattern strings may be expanded to include at least two additional fields associated with each of the additional pattern strings. In the present example, the additional fields include a length field indicating the length of the additional string (e.g., "7") and a pattern string field representing the characters or symbols of the additional string (e.g., "USER001").

Figure 4A:
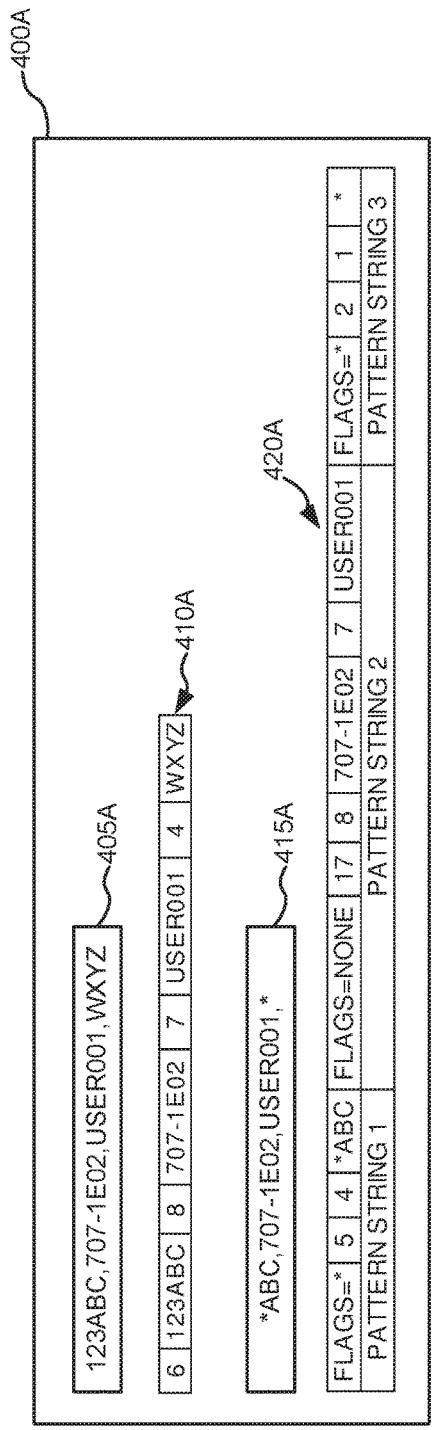
FIG. 4A depicts example configuration for matching a list of pattern strings against a list of data strings, according to various embodiments.

FIG. 4A depicts example configuration 400A for matching a list of pattern strings against a list of data strings, according to various embodiments. In the example, the list of data strings 405A with corresponding data structure 410A is matched against a list of pattern strings 415A with corresponding data structure 420A. In some embodiments the data string 405A may be matched against the pattern string 415A by a string matching system, as described herein.

The string matching system may first compare the number of data strings in the list of data strings 410A (or analogously, sparse list of data strings 405A) against the number of pattern strings in list of pattern strings 420A (or analogously, sparse list of pattern strings 415A). Since each list contains four strings, string matching system may proceed to matching corresponding strings of each list, as described in the operations of flowchart 100 (FIG. 1) and flowchart 200 (FIG. 2). As an example, the first data string "123ABC" matches corresponding first pattern string "*ABC" according to a wildcard string compare, with wildcard character for matching zero or more characters ("*") matching the characters "123" of the data string. Similarly, the second data string "707-1E02" matches corresponding second pattern string "707-1E02" according to an exact string compare. Furthermore, the third data string "USER001" matches corresponding third pattern string "USER001" according to an exact string compare. Finally, the fourth data string "WXYZ" matches corresponding fourth pattern string "*" according to a wildcard string compare, with the wildcard symbol for matching zero or more characters matching the data string "WXYZ." The string matching system may return a data value indicating that the list of data strings represented by data structure 410A matches the list of pattern strings represented data structure 420A.

Figure 4B:
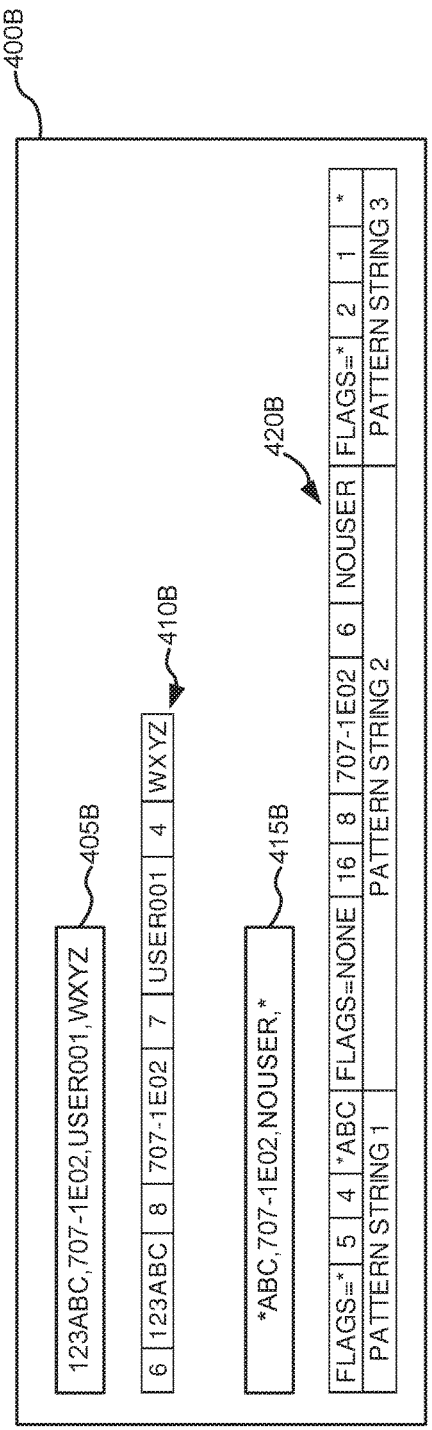
FIG. 4B depicts example configuration for matching a list of pattern strings against a list of data strings, according to various embodiments.

FIG. 4B depicts example configuration 400B for matching a list of pattern strings against a list of data strings, according to various embodiments. In the example configuration 400B, a list of data strings 405B with corresponding data structure 410B is matched against a list of pattern strings 415B with corresponding data structure 420B. In some embodiments the data string 405B may be matched against the pattern string 415B by a string matching system, as described herein.

The string matching system may determine that the number of strings in the lists, and the corresponding first and second strings in each list, match, as described previously. The string matching system may then determine that the third data string "USER001" does not match the third pattern string "NOUSER" according to an exact string compare. At this point the string matching system may terminate the matching operation and indicate the list of data strings represented by data structure 410B does not match the list of pattern strings represented by data structure 420B.

Figure 5:
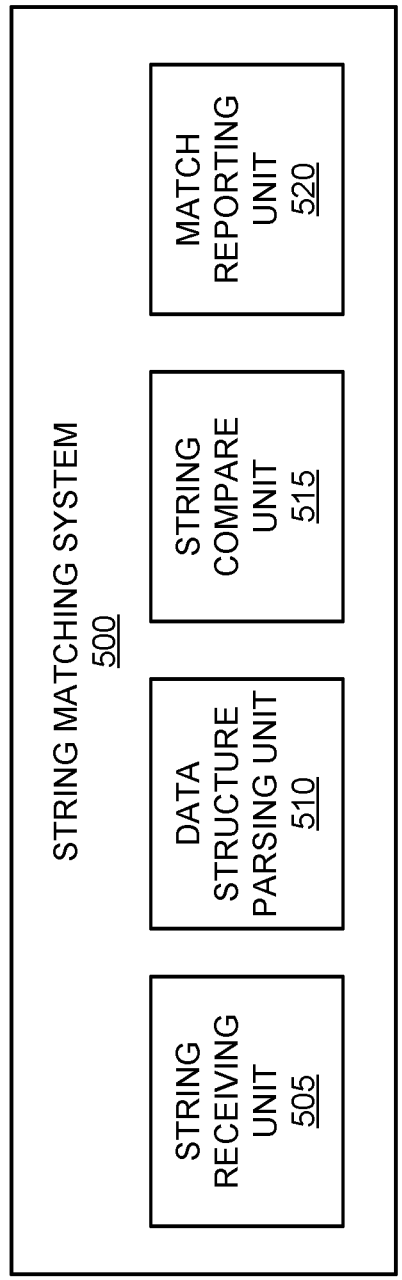
FIG. 5 depicts a block diagram of a system for matching a list of pattern strings against a list data strings, according to various embodiments.

FIG. 5 depicts a block diagram of a system 500 for matching a list of pattern strings against a list data strings, according to various embodiments. The string matching system 500 may include software applications and/or hardware components for implementing the operations described in FIGS. 1-4. The string matching system 500 may include a string receiving unit 505, a data structure parsing unit 510, a string compare unit 515, and a match reporting unit 520. The components of the string matching system 500 may exchange data via a shared memory of a computing system, or via other communication channels such as software sockets or a data communications network.

The string receiving unit 505 may receive a list of pattern strings and a list of data strings to compare. In some embodiments, the list of pattern strings and the list of data strings may be received from a GUI. In certain embodiments, the list of pattern strings and the list of data strings may be read from a storage device and/or a memory of a computing system accessible to the string matching system. In some embodiments, receiving the list of pattern strings and the list of data strings may include accessing a memory of a computing device storing the lists. In an example, a list of pattern strings may be entered into a GUI by a user. The string receiving unit 505 may retrieve the list of pattern strings from the GUI and store them in a formatted data structure in a memory of a computing system. The string receiving unit 505 may also receive the list of pattern strings as a formatted data structure transferred to the string matching system via, for example, inter-process (e.g., software sockets) or network communications channels. In an additional example, the string receiving unit 505 may receive the list of data strings by reading a file stored on a storage medium (e.g., a disk drive) or by querying and receiving a table from a database system.

The data structure parsing unit 510 may receive a first data structure having a list of pattern strings, and a second data structure having a second list of data strings from a component of the string matching system 500 (e.g., the string receiving unit 505). The data structure parsing unit 510 may then parse the list of pattern strings and the list of data strings to determine, inter alia, the number strings in each list and whether the list of pattern strings includes wildcards. The parsed information may be stored in a memory area of a computing system available to the string matching system 500.

The string compare unit 515 may receive the pattern and list of data strings from the string matching system 500 for matching. In some embodiments, the string compare unit 515 may receive parsed information indicating, for example, the number of strings in the lists, and whether the pattern strings include wildcards. The string compare unit 515 may then compare the pattern and data lists using known string comparison algorithms in conjunction with the operations described herein. In certain embodiments, the string compare unit may provide a determination of whether the list of data strings matches the list of pattern strings to the string matching system 500.

The match reporting unit 520 may receive a determination of whether the list of data strings matches the list of pattern strings from the string matching system 500. The match reporting unit may then provide the determination of the match to an application of the computing system. In some embodiments, the determination may be made available to an application of the computing system by writing a data value including the determination to an area of memory of the computing system available to the application.

FIG. 6 depicts a block diagram of a computing device 600 for implementing a system for matching a list of pattern strings against a list data strings, according to various embodiments. The system may be an embodiment of the string matching system 500 (FIG. 5).

The components of the computing device 600 may include one or more processors 606, a memory 612, a terminal interface 618, a storage interface 620, an Input/Output ("I/O") device interface 622, and a network interface 624, all of which are communicatively coupled, directly or indirectly, for inter-component communication via a memory bus 610, an I/O bus 616, bus interface unit ("IF") 608, and an I/O bus interface unit 614.

The computing device 600 may include one or more general-purpose programmable central processing units (CPUs) 606A and 606B, herein generically referred to as the processor 606. In certain embodiments, a processor may be any electronic device for executing a sequence of programmed instructions. In an embodiment, the computing device 600 may contain multiple processors; however, in another embodiment, the computing device 600 may alternatively be a single CPU device. Each processor 606 executes instructions stored in the memory 612.

The computing device 600 may include a bus interface unit 608 to handle communications among the processor 606, the memory 612, the display system 604, and the I/O bus interface unit 614. The I/O bus interface unit 614 may be coupled with the I/O bus 616 for transferring data to and from the various I/O units. The I/O bus interface unit 614 may communicate with multiple I/O interface units 618, 620, 622, and 624, which are also known as I/O processors (IOPs) or I/O adapters (IOAs), through the I/O bus 616. The display system 604 may include a display controller, a display memory, or both. The display controller may provide video, audio, or both types of data to a display device 602. The display memory may be a dedicated memory for buffering video data. The display system 604 may be coupled with a display device 602, such as a standalone display screen, computer monitor, television, a tablet or handheld device display, or another other displayable device. In an embodiment, the display device 602 may include one or more speakers for rendering audio. Alternatively, one or more speakers for rendering audio may be coupled with an I/O interface unit. In alternate embodiments, one or more functions provided by the display system 604 may be on board an integrated circuit that also includes the processor 606. In addition, one or more of the functions provided by the bus interface unit 608 may be on board an integrated circuit that also includes the processor 606.

The I/O interface units support communication with a variety of storage and I/O devices. For example, the terminal interface unit 618 may support the attachment of one or more user I/O devices, which may include user output devices (such as a video display devices, speaker, and/or television set) and user input devices (such as a keyboard, mouse, keypad, touchpad, trackball, buttons, light pen, or other pointing devices). A user may manipulate the user input devices using a user interface, in order to provide input data and commands to the user I/O device 626 and the computing device 600, or may receive output data via the user output devices. For example, a user interface may be presented via the user I/O device 626, such as may be displayed on a display device, played via a speaker, or printed via a printer.

The storage interface 620 supports the attachment of one or more storage devices, which may include disk drives or direct access storage devices 628 (which are typically rotating magnetic disk drive storage devices, although they could alternatively be other storage devices, including arrays of disk drives configured to appear as a single large storage device to a host computer, or solid-state drives, such as a flash memory). In another embodiment, the storage device 628 may be implemented via any type of secondary storage device. The contents of the memory 612, or any portion thereof, may be stored to and retrieved from the storage device 628 as needed. The I/O device interface 622 provides an interface to any of various other I/O devices or devices of other types, such as printers or fax machines. The network interface 624 provides one or more communication paths from the computing device 600 to other digital devices and computer systems.

Although the computing device 600 shown in FIG. 5 illustrates a particular bus structure providing a direct communication path among the processors 606, the memory 612, the bus interface 608, the display system 604, and the I/O bus interface unit 614, in alternative embodiments the computing device 600 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 614 and the I/O bus 608 are shown as single respective units, the computing device 600, may include multiple I/O bus interface units 614 and/or multiple I/O buses 616. While multiple I/O interface units are shown, which separate the I/O bus 616 from various communication paths running to the various I/O devices, in other embodiments, some or all of the I/O devices are connected directly to one or more system I/O buses.

In various embodiments, the computing device 600 is a multi-user mainframe computer system, a single-user system, or a server computer or similar device that has little or no direct user interface, but receives requests from other computer systems (clients). In other embodiments, the computing device 600 may be implemented as a desktop computer, portable computer, laptop or notebook computer, tablet computer, pocket computer, telephone, smart phone, or any other suitable type of electronic device.

In an embodiment, the memory 612 may include a random-access semiconductor memory, storage device, or storage medium (either volatile or non-volatile) for storing or encoding data and programs. In another embodiment, the memory 612 represents the entire virtual memory of the computing device 600, and may also include the virtual memory of other computer systems coupled to the computing device 600 or connected via a network 630. The memory 612 may be a single monolithic entity, but in other embodiments the memory 612 may include a hierarchy of caches and other memory devices. For example, memory may exist in multiple levels of caches, and these caches may be further divided by function, so that one cache holds instructions while another holds non-instruction data, which is used by the processor. Memory 612 may be further distributed and associated with different CPUs or sets of CPUs, as is known in any various so-called non-uniform memory access (NUMA) computer architectures.

The memory 612 may store all or a portion of the components and data shown in FIGS. 1-5. In particular, the memory 612 may store a software application component of a string matching system 613A, a list of pattern strings 613B, and a list of data strings 613C. The memory 612 may also store other modules, scripts and library components used to implement the operations of the present disclosure. The software application component of the string matching system 613A may be an embodiment of the string matching system 500 (FIG. 5) and may include computer executable code for performing operations described in flowchart 100 of FIG. 1 and flowchart 200 of FIG. 2. The software application component of the string matching system 613A may additionally include computer executable code for orchestrating and performing operations of the components described in the discussion of FIGS. 1 and 5. The computer executable code may be executed by processor 606. Some or all of the components and data shown in FIGS. 1-5 may be on different computer systems and may be accessed remotely, e.g., via a network 630. The computing device 600 may use virtual addressing mechanisms that allow the programs of the computing device 600 to behave as if they only have access to a large, single storage entity instead of access to multiple, smaller storage entities. Thus, while the components and data shown in FIGS. 1-5 are illustrated as being included within the memory 612, these components and data are not necessarily all completely contained in the same storage device at the same time. Although the components and data shown in FIGS. 1-5 are illustrated as being separate entities, in other embodiments some of them, portions of some of them, or all of them may be packaged together.

In an embodiment, the components and data shown in FIGS. 1-5 may include instructions or statements that execute on the processor 606 or instructions or statements that are interpreted by instructions or statements that execute the processor 606 to carry out the functions as further described below. In another embodiment, the components shown in FIGS. 1-5 may be implemented in hardware via semiconductor devices, chips, logical gates, circuits, circuit cards, and/or other physical hardware devices in lieu of, or in addition to, a processor-based system. In an embodiment, the components shown in FIGS. 1-5 may include data in addition to instructions or statements.

FIG. 5 is intended to depict representative components of the computing device 600. Individual components, however, may have greater complexity than represented in FIG. 5. In FIG. 5, components other than or in addition to those shown may be present, and the number, type, and configuration of such components may vary. Several particular examples of additional complexity or additional variations are disclosed herein; these are by way of example only and are not necessarily the only such variations. The various program components illustrated in FIG. 5 may be implemented, in various embodiments, in a number of different ways, including using various computer applications, routines, components, programs, objects, modules, data structures etc., which may be referred to herein as "software," "computer programs," or simply "programs."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer implemented method for matching a first list of pattern strings to a second list of data strings, the first and second lists stored in respective first and second data structures in memory, the first list including zero or more wild cards, the method comprising:
   identifying, for each pattern string in the first list, a data string in the second list corresponding with the pattern string,
      wherein a first pattern string corresponds with a first data string when the first pattern string and the first data string occupy a same position in the respective first and second lists,
   determining whether the first list matches the second list by:
      determining, for each pattern string in the first list, whether the pattern string includes a wildcard for matching zero or more characters of a data string corresponding with the pattern string;
      determining, in response to determining that the pattern string includes a wildcard, whether a number of data strings in the second list is greater than or equal to a number of pattern strings in the first list;
      performing, in response to determining that the number of data strings in the second list is greater than or equal to the number of pattern strings in the first list, a wildcard string comparison between the pattern string and the data string corresponding with the pattern string; and
   providing, in memory, a data value indicating whether the first list matches the second list.

2. The method of claim 1, wherein the first data structure includes a set of sub-structures, wherein a sub-structure of the set of sub-structures includes:
   a pattern string element, the pattern string element storing a pattern string; and
   a metadata element, the metadata element including information indicating a length of the pattern string and a presence of wildcards in the pattern string.

3. The method of claim 1, wherein determining whether the first list matches the second list further comprises:
   determining that the first list does not match the second list when the number of data strings in the second list is less than the number of pattern strings in the first list.

4. The method of claim 3, further comprising:
   determining that the first list does not include a wildcard for matching all remaining strings in the second list; and
   determining that the first list does not match the second list when the number of data strings in the second list is greater than the number of pattern strings in the first list.

5. The method of claim 1, further comprising:
   performing, in response to determining that the pattern string does not include a wildcard, a straight string comparison between the pattern string and the data string corresponding with the pattern string.

6. The method of claim 1, further comprising:
   determining that a first pattern string and a second pattern string do not include a wildcard for matching zero or more characters, wherein first pattern string occupies a first position in the first list adjacent to a second position occupied by the second pattern string in the first list; and
   performing, in response to determining that a first pattern string and a second pattern string do not include a wildcard for matching zero or more characters, a straight string comparison between the combined first and second pattern strings and data strings corresponding with the combined first and second pattern strings.

7. The method of claim 1, wherein the first list is an ordered list of pattern strings.

8. A computer system for matching a first list of pattern strings to a second list of data strings, the first and second lists stored in respective first and second data structures in memory, the first list including zero or more wild cards, the system comprising:
   one or more computing nodes having a memory and a processor; and
   a computer readable storage medium of the one or more computing nodes having program instructions embodied therewith, the program instructions executable by the processor to cause the computer system to:
      identify, for each pattern string in the first list, a data string in the second list corresponding with the pattern string,
         wherein a first pattern string corresponds with a first data string when the first pattern string and the first data string occupy a same position in the respective first and second lists,
      determine whether the first list matches the second list by:
         determining, for each pattern string in the first list, whether the pattern string includes a wildcard for matching zero or more characters of a data string corresponding with the pattern string;
         determining, in response to determining that the pattern string includes a wildcard, whether a number of data strings in the second list is greater than or equal to a number of pattern strings in the first list;
         performing, in response to determining that the number of data strings in the second list is greater than or equal to the number of pattern strings in the first list, a wildcard string comparison between the pattern string and the data string corresponding with the pattern string; and
      provide, in memory, a data value indicating whether the first list matches the second list.

9. The computer system of claim 8, wherein the first data structure includes a set of sub-structures, wherein a sub-structure of the set of sub-structures includes:
   a pattern string element, the pattern string element storing a pattern string; and
   a metadata element, the metadata element including information indicating a length of the pattern string and a presence of wildcards in the pattern string.

10. The computer system of claim 8, wherein program instructions executable by the processor further cause the computer system to:
    determine that the first list does not match the second list when the number of data strings in the second list is less than the number of pattern strings in the first list.

11. The computer system of claim 10, wherein the program instructions executable by the processor further cause the computer system to:
    determine that the first list does not include a wildcard for matching all remaining strings in the second list; and determine that the first list does not match the second list when the number of data strings in the second list is greater than the number of pattern strings in the first list.

12. The computer system of claim 8, wherein the program instructions executable by the processor further cause the computer system to:
perform, in response to determining that the pattern string does not include a wildcard, straight string comparison between the pattern string and the data string corresponding with the pattern string.

13. The computer system of claim 8, wherein the program instructions executable by the processor further cause the computer system to:
determine that a first pattern string and a second pattern string do not include a wildcard for matching zero or more characters, wherein first pattern string occupies a first position in the first list adjacent to a second position occupied by the second pattern string in the first list; and
perform, in response to determining that a first pattern string and a second pattern string do not include a wildcard for matching zero or more characters, a straight string comparison between the combined first and second pattern strings and data strings corresponding with the combined first and second pattern strings.

14. The computer system of claim 8, wherein the first list is an ordered list of pattern strings.

15. A computer program product for matching a first list of pattern strings to a second list of data strings, the first and second lists stored in respective first and second data structures in memory, the first list including zero or more wild cards, the computer program product including a computer readable storage medium having program instructions embodied therewith, wherein the computer readable storage medium is not a transitory signal per se, the program instructions executable by a processing circuit to cause the processing circuit to perform a method comprising:
identifying, for each pattern string in the first list, a data string in the second list corresponding with the pattern string,
wherein a first pattern string corresponds with a first data string when the first pattern string and the first data string occupy a same position in the respective first and second lists,
determining whether the first list matches the second list by:
determining, for each pattern string in the first list, whether the pattern string includes a wildcard for matching zero or more characters of a data string corresponding with the pattern string;
determining, in response to determining that the pattern string includes a wildcard, whether a number of data strings in the second list is greater than or equal to a number of pattern strings in the first list;
performing, in response to determining that the number of data strings in the second list is greater than or equal to the number of pattern strings in the first list, a wildcard string comparison between the pattern string and the data string corresponding with the pattern string; and
providing, in memory, a data value indicating whether the first list matches the second list.

16. The computer program product of claim 15, wherein the first data structure includes a set of sub-structures, wherein a sub-structure of the set of sub-structures includes:
a pattern string element, the pattern string element storing a pattern string; and
a metadata element, the metadata element including information indicating a length of the pattern string and a presence of wildcards in the pattern string.

17. The computer program product of claim 16, wherein determining whether the first list matches the second list further comprises:
determining that the first list does not match the second list when the number of data strings in the second list is less than the number of pattern strings in the first list.

18. The computer program product of claim 17, the method further comprising:
determining that the first list does not include a wildcard for matching all remaining strings in the second list; and
determining that the first list does not match the second list when the number of data strings in the second list is greater than the number of pattern strings in the first list.

19. The computer program product of claim 15, the method further comprising:
performing, in response to determining that the pattern string does not include a wildcard, a straight string comparison between the pattern string and the data string corresponding with the pattern string.

20. The computer program product of claim 15, the method further comprising:
determining that a first pattern string and a second pattern string do not include a wildcard for matching zero or more characters, wherein first pattern string occupies a first position in the first list adjacent to a second position occupied by the second pattern string in the first list; and
performing, in response to determining that a first pattern string and a second pattern string do not include a wildcard for matching zero or more characters, a straight string comparison between the combined first and second pattern strings and data strings corresponding with the combined first and second pattern strings.

\* \* \* \* \*